(12) United States Patent
Dekort et al.

(10) Patent No.: US 8,015,714 B2
(45) Date of Patent: Sep. 13, 2011

(54) SHIELD ATTACHMENT FOR HAND-HELD DIGGING TOOLS

(76) Inventors: Phillip Dekort, Chestermere (CA);
Matthew Dekort, Chestermere (CA);
Henry Dekort, Chestermere (CA)

(*) Notice: Subject to any disclaimer, the term of this patent is extended or adjusted under 35 U.S.C. 154(b) by 523 days.

(21) Appl. No.: 11/675,447

(22) Filed: Feb. 15, 2007

(65) Prior Publication Data

US 2007/0251102 A1     Nov. 1, 2007

Related U.S. Application Data

(60) Provisional application No. 60/746,130, filed on May 1, 2006.

(51) Int. Cl.
*B26B 23/00* (2006.01)
(52) U.S. Cl. .......................................... 30/308.1; 30/286
(58) Field of Classification Search ...... 30/308.1–308.3, 30/286; 7/114–116, 145; 294/56, 60, 131, 294/59; 81/489, 487, 488, 20, 21
See application file for complete search history.

(56) References Cited

U.S. PATENT DOCUMENTS

| | | | |
|---|---|---|---|
| 1,236,968 A | 8/1917 | Mockel | |
| 1,336,630 A | 4/1920 | Kirkpatrick | |
| 1,358,206 A | 11/1920 | Higgins | |
| 5,322,311 A * | 6/1994 | Dunn | 280/152.1 |
| 5,345,635 A | 9/1994 | Morgan | |
| 5,503,445 A * | 4/1996 | Fontaine | 294/60 |
| 5,901,996 A * | 5/1999 | Churchman et al. | 294/60 |
| 6,378,153 B1 | 4/2002 | Morgan | |
| 2002/0144408 A1 | 10/2002 | Cho | |
| 2006/0170231 A1* | 8/2006 | Brown et al. | 294/60 |

OTHER PUBLICATIONS

Examination report from the EPO for corresponding EP application EP 07 719567.5.
Examination report from the EPO for corresponding EP application EP 07 719567.5, Mar. 6, 2009.

* cited by examiner

*Primary Examiner* — Phong H Nguyen
(74) *Attorney, Agent, or Firm* — Sean W Goodwin

(57) ABSTRACT

The present invention provides a removable shield attachment for hand-held digging tools which is mounted on the tool handle below the tool head so as to not interfere with gripping along the length of the handle. The shield generally comprises a mounting portion adapted to be mounted on the handle below the tool head, a shield portion extending laterally outwardly and upwardly from the mounting portion, and a slot positioned between the mounting portion and the shield portion adapted for passing a blade of the tool head therethrough. In use, the shield portion is positioned above the blade, thereby intercepting debris flying from the blade and towards the worker. The shield is particularly designed for digging tools having a slidably fit tool head that engages an outwardly tapered working end of the handle, with the shield being attached to the handle in the same manner as the tool head itself.

23 Claims, 11 Drawing Sheets

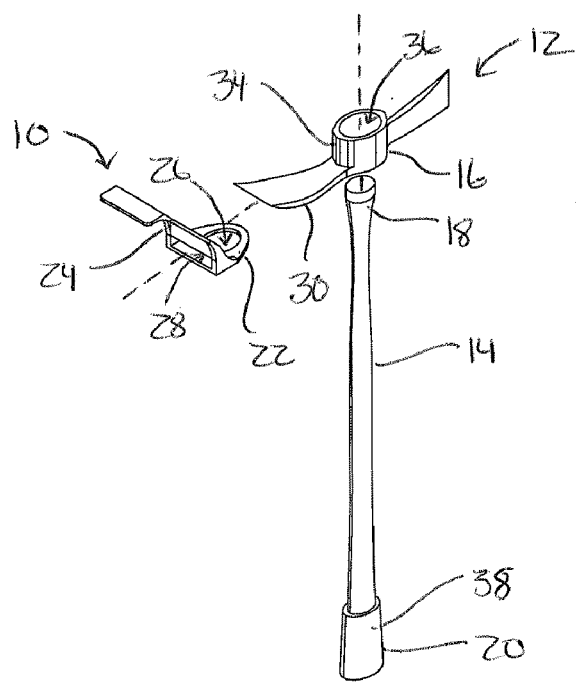
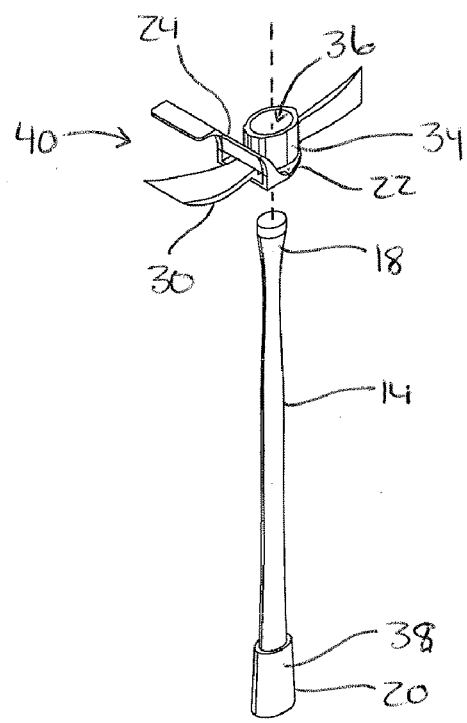
Fig. 11A  Fig. 11B
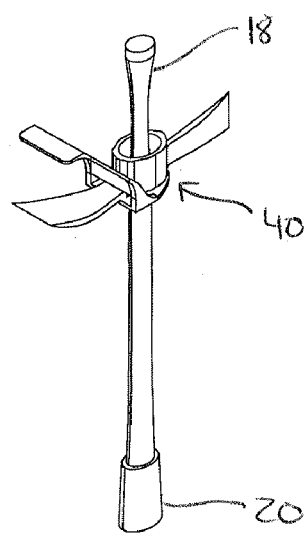
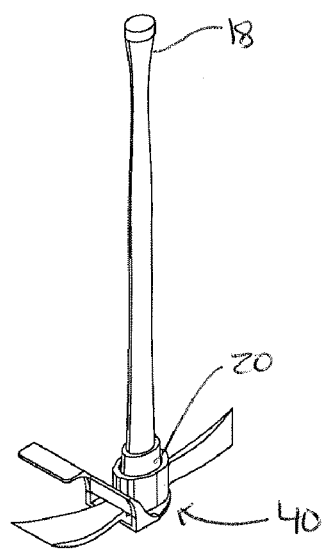
Fig. 11C  Fig. 11D

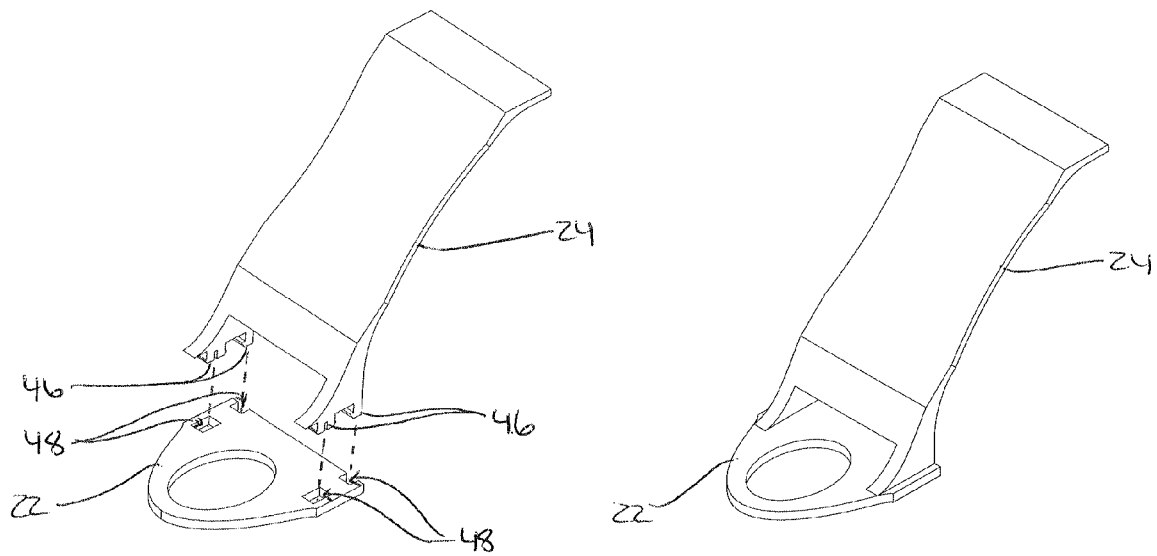
Fig. 17A
Fig. 17B
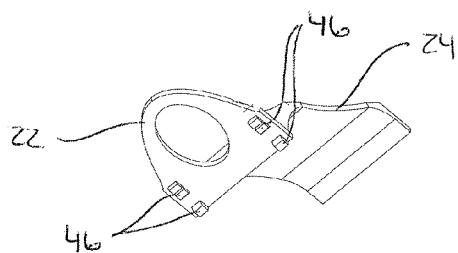
Fig. 17C

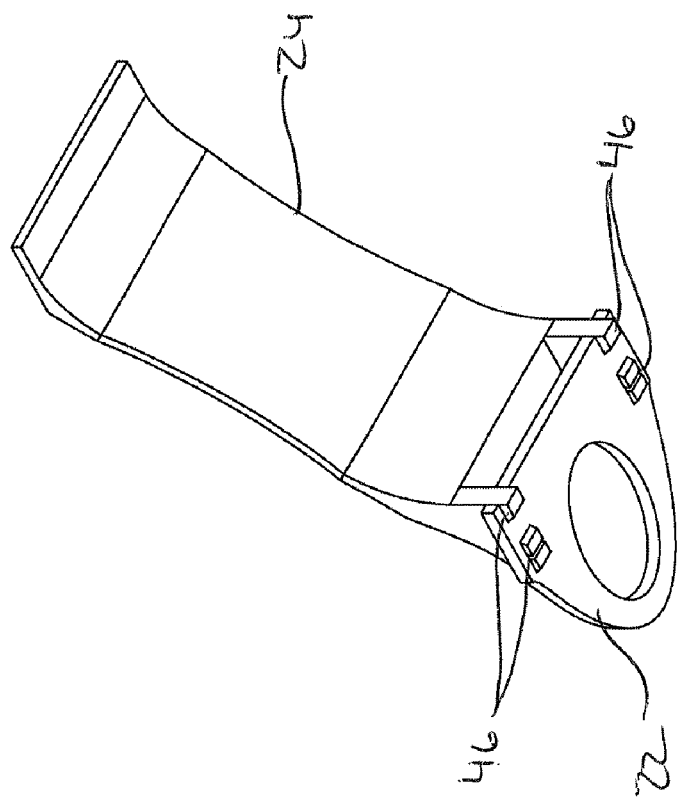
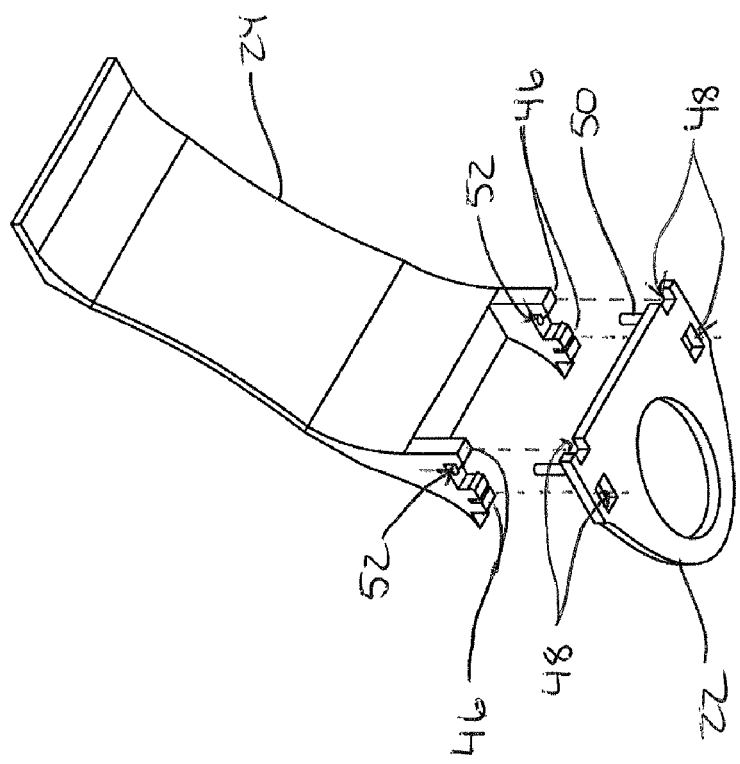

SHIELD ATTACHMENT FOR HAND-HELD DIGGING TOOLS

CROSS-REFERENCE TO RELATED APPLICATIONS

This application claims the benefit of U.S. provisional application No. 60/746,130 filed May 1, 2006, the entirety which is herein incorporated by reference.

FIELD OF THE INVENTION

The invention relates to attachments for digging tools and in particular to shield attachments for hand-held digging tools such as a pickaxe, mattock, pulaski, adze and the like for protecting the user from flying debris.

BACKGROUND OF THE INVENTION

The use of hand-held digging tools or chipping tools, such as pickaxes and mattocks, can pose risk of injury to a worker from flying debris which is thrown out from the blade of the tool head, especially when digging into hard materials like asphalt, cement, ice, hard pan, clay, gravel, roots and so forth. To protect the worker, particularly the face, neck and head area, shield attachments can be attached to the tool to intercept debris flying toward the worker, while still permitting use of the tool. Such shield attachments are also useful for protecting other persons and property in the vicinity of the worker.

Examples of previous shield attachments include those disclosed in U.S. Pat. No. 1,236,968 to Mockel, U.S. Pat. No. 1,336,630 to Kirkpatrick and U.S. Pat. No. 1,358,206 to Higgins. In each of those cases, a shield portion is removably attached to the tool handle by an attaching structure positioned around the handle. In general, the attaching structure is positioned above the tool head, with the shield portion being positioned adjacent the underside of the handle and between the blade and the worker. The position of the attaching structure above the tool head, however, interferes with the ability of the worker to grip the full length of the handle adjacent the tool head during the initiation of the stroke, which is often desired for achieving maximum force when using the tool. Further, some prior art designs utilize wire as an attaching structure, which may not adequately secure the shield portion in place, while other designs require the use of clamps and tools to attach the shield portion.

There is, therefore, a need in the art for an improved shield attachment for hand-held digging tools.

SUMMARY OF THE INVENTION

The present invention provides a removable shield attachment or shield for hand-held digging tools that is simple in design and operation and which is easily adapted for use with a variety of digging tools. Such digging tools generally comprise a handle and a tool head having a generally outwardly extending blade, with the shield being adapted to be secured onto the tool handle below the tool head so as to not interfere with gripping along the length of the handle.

According to a broad aspect of the invention, the shield comprises a mounting portion adapted to be mounted on the handle below the tool head and a shield portion extending laterally outwardly and upwardly from the mounting portion. A slot formed between the mounting portion and the shield portion adapted for passing the blade of the tool head therethrough permits the shield portion to be generally positioned above the blade so as to intercept flying debris flying from the blade and towards the worker. Generally, the shield does not extend past the blade so as to not interfere with the operation of the tool.

In an embodiment of the invention, the shield is particularly designed for use with a digging tool having a removable tool head that is adapted to be slidably fit along the handle from an upper gripping end to a lower outwardly tapered working end and detachable engagement therewith, with such tools being well known in the art. The mounting portion is adapted to be slidably fit along the tool handle and engagement with the working end below the tool head, such as by forming a mounting hole. The shield is simply attached to the digging tool by inserting the blade into the slot to form a shield-head unit which is then slidably fit onto and removed from the handle as for the tool head itself without the need for additional tools or fasteners. Further, the shield is securely fit on the handle as it is sandwiched between the working end and the tool head.

The shield can be adapted for use with a wide variety of tools by, for example, adjusting the dimensions of the blade slot and shield portion, as well as the angle of the shield portion relative to the mounting portion, as necessary. The shield can also include other features such as a distal outwardly extending lip and downwardly extending side extensions to help contain scatter of the debris and may also stiffen the shield.

Other variations and aspects of the invention are described.

BRIEF DESCRIPTION OF THE DRAWINGS

In drawings which are intended to illustrate embodiments of the invention and which are not intended to limit the scope of the invention:

FIGS. 11A-11D are perspective views of FIG. 1 showing the sequence of attachment of the shield to the pulaski, with the tool handle also including a sleeve;

FIG. 17A is a perspective and exploded view of yet another embodiment of a shield according to the present invention with the shield having a replaceable shield portion;

FIG. 17B is the shield of FIG. 17A with the shield assembled;

FIG. 17C is a bottom perspective view of FIG. 17B;

FIG. 18A is a perspective and exploded view of yet another embodiment of a shield according to the present invention with the shield having replaceable shield portion and posts;

FIG. 18B is the shield of FIG. 18A with the shield assembled;

DETAILED DESCRIPTION OF THE INVENTION

Figure 1:
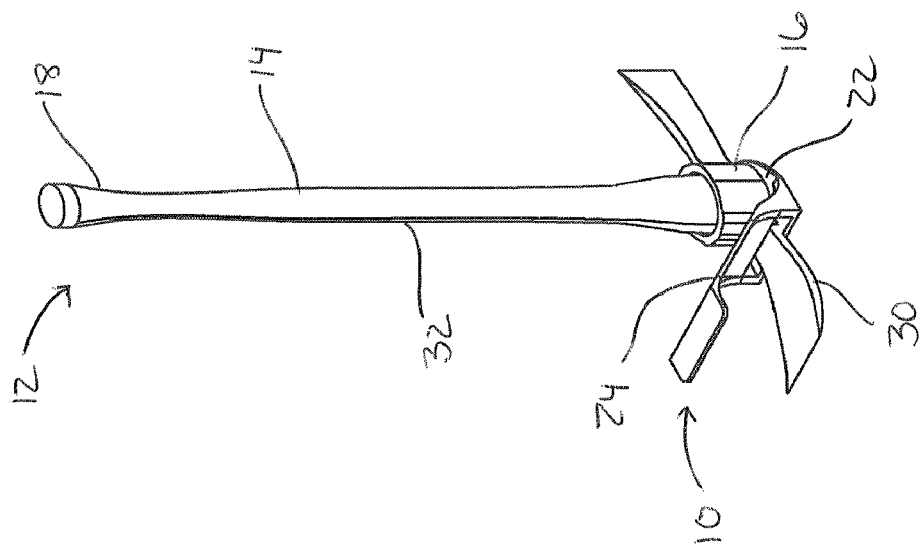
FIG. 1 is a side elevational view of one embodiment of a shield in accordance with an embodiment of the present invention, with the shield attached to a pulaski.

With reference to FIGS. 1-6, a shield attachment or shield 10 is shown attached to a hand-held digging tool 12, in this case a pulaski. In general, as shown in FIG. 1, the digging tool has a handle 14 and a tool head 16, with the handle 14 having an upper gripping end 18 a lower working end 20 onto which the tool head 16 is mounted. The shield is particularly designed for digging tools 12 having a removable tool head 16, with the shield 10 also being removable.

As used herein, the term hand-held "digging tools" is broadly defined to include any hand-held digging, chipping, or striking tool which is suitable for use with the shield attachment, including, for example, a pickaxe, mattock, maul, axe, pulaski, adze and combinations thereof. For example, a pulaski combines an axe and a mattock in one tool head.

Figure 2:
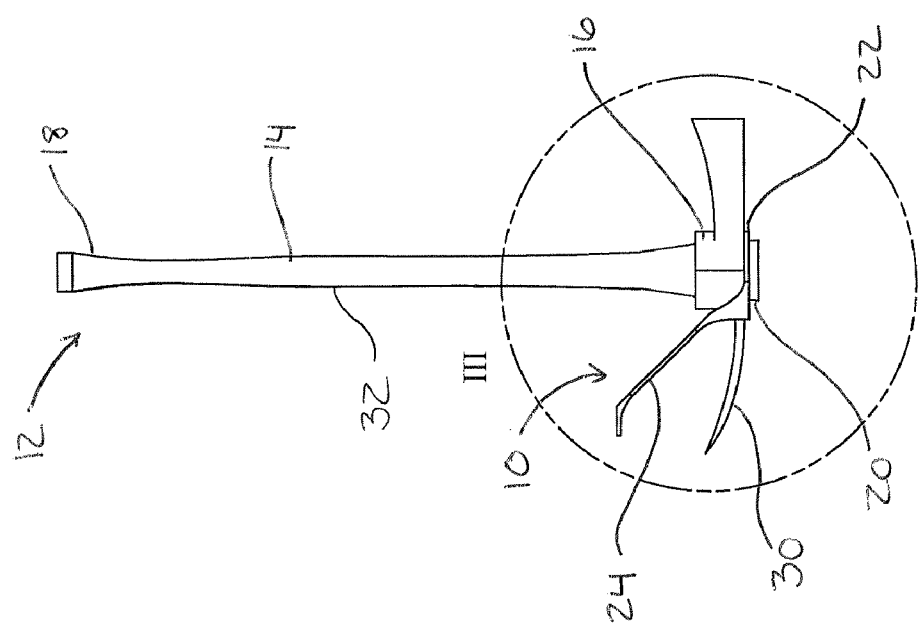
FIG. 2 is a perspective view of the shield of FIG. 1.
Figure 3:
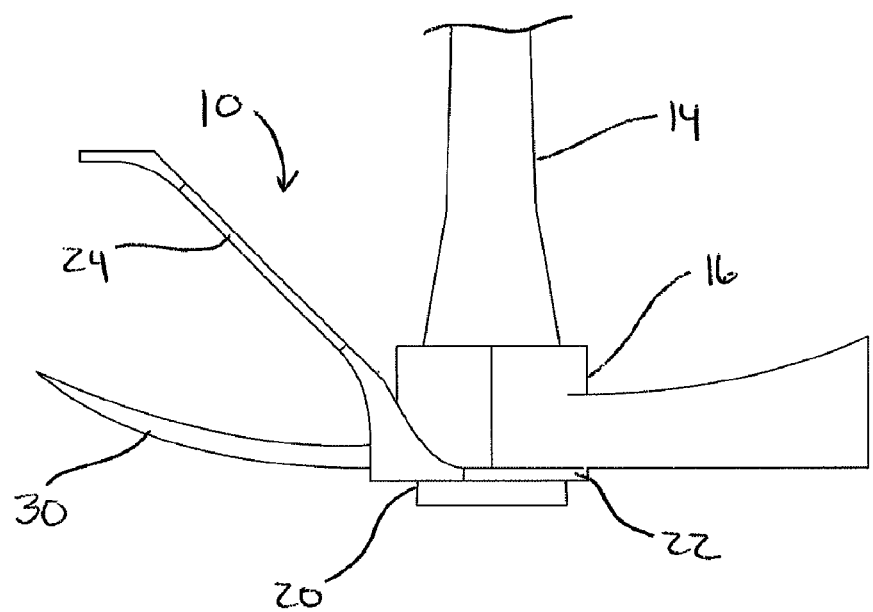
FIG. 3 is a close-up view of the area indicated by III in FIG. 1
Figure 4:
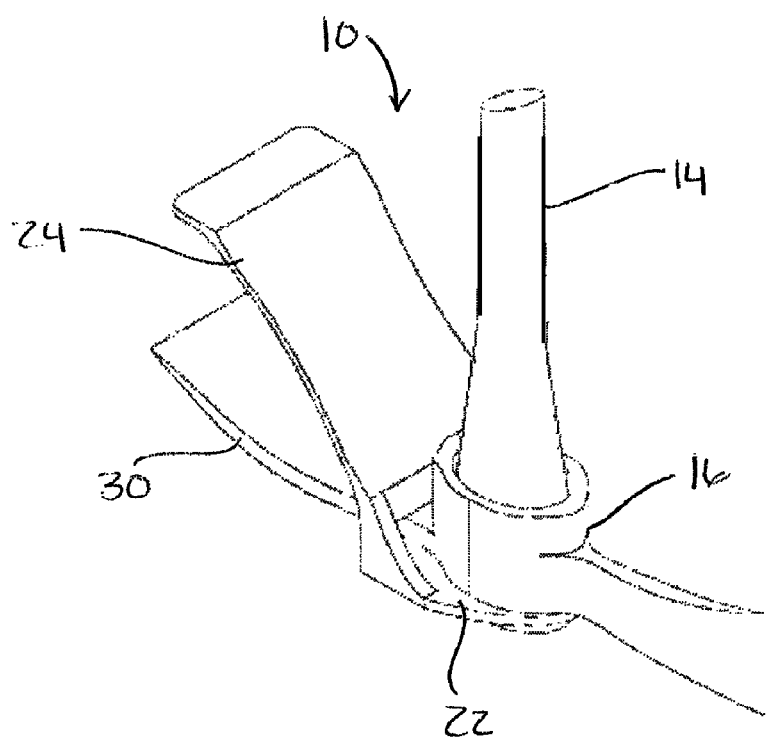
FIG. 4 is a perspective view of FIG. 3.
Figure 5:
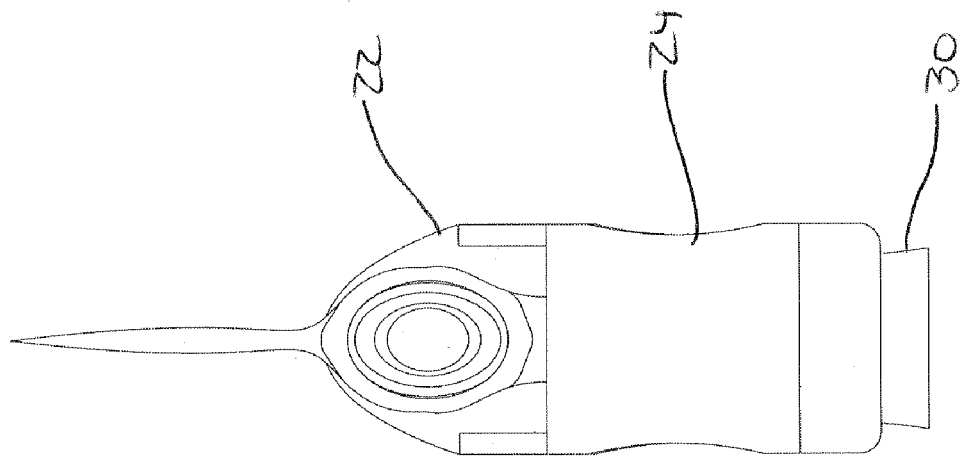
FIG. 5 is a front elevational view of FIG. 3.
Figure 6:
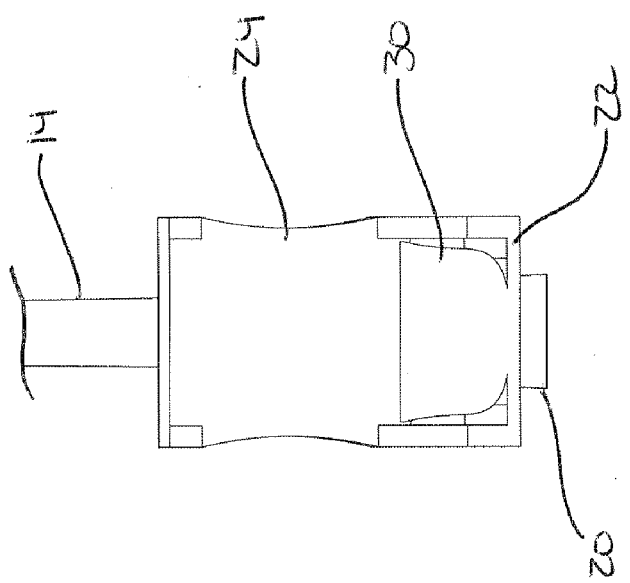
FIG. 6 is a top view of FIG. 1.
Figure 7:
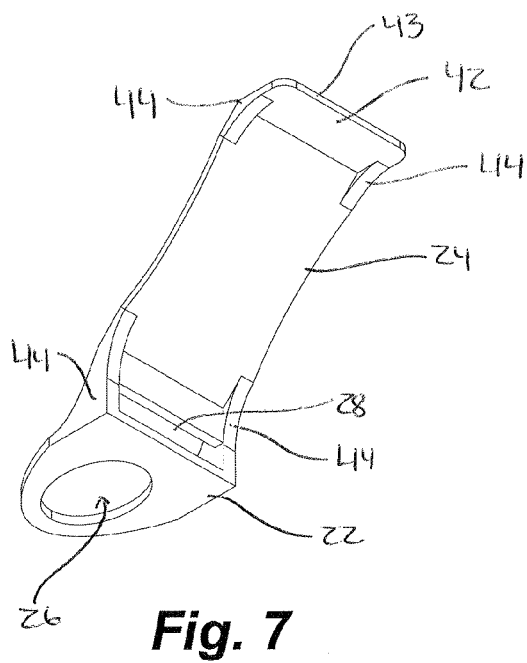
FIG. 7 is a perspective view of the shield of FIG. 1.
Figure 8:
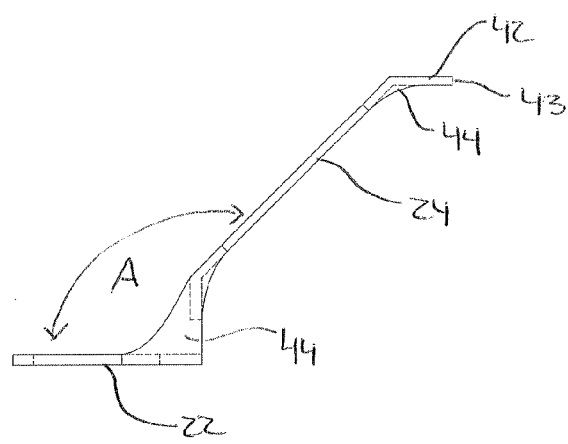
FIG. 8 is a side elevational view of FIG. 7.
Figure 9:
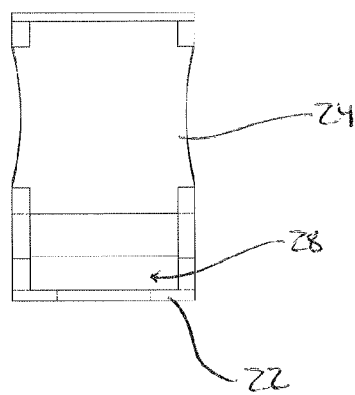
FIG. 9 is a back elevational view of FIG. 7.
Figure 12:
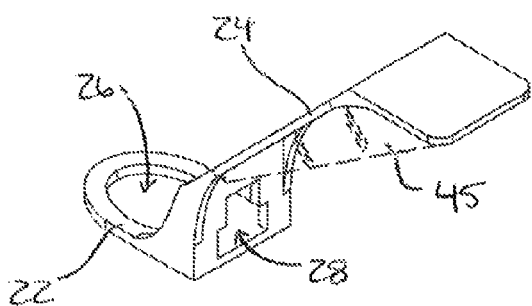
FIG. 12 is a perspective view of another embodiment of a shield in accordance with the present invention, with the shield adapted for use with a pickaxe and showing optional side extensions in dashed line.

In detail and with further reference to the shield as illustrated in FIGS. 7-10, the shield 10 comprises a laterally extending mounting portion 22 (perpendicular to the longitudinal axis of the handle) for removably mounting the shield 10 onto the tool handle 14 and a shield portion 24 that extends generally upwardly and outwardly from the mounting portion 22 forming an angle A (FIG. 8). The mounting portion 22 forms a mounting hole 26 for receiving the tool handle 14 and to position the mounting portion 22 below the tool head 16. A blade slot 28 formed between the shield portion 24 and the mounting portion 22 provides a passage for a blade 30 of the tool head 16. As shown in FIG. 12, the blade slot 28 is formed by two sidewalls 31,31 extending from two sides of the mounting portion 22 and connected to the shield portion 24 and the mounting portion 22. As best seen in FIGS. 1 and 2, when attached to the digging tool 12, the shield portion 24 is generally positioned adjacent the underside 32 of the handle 14 and between the blade 30 and the gripping end 18 of the tool. The shield 10 is thus adapted to intercept debris flying from the blade 30 and, for instance, towards a worker using the tool 12.

Referring now to FIGS. 11A-11D, in digging tools that are particularly useful with the present invention, the tool head has a collar 34 forming an outwardly tapered bore 36 that is slidably fit over a narrow gripping end 18 of the handle and engages a wider outwardly tapered working end of the handle 20. The tapered working end may include an outer sleeve 38, as shown. The tapered working end 20 has a greater dimension than the tapered bore 36 so that in use, inertial forces tighten the tool head 16 to the handle 14. To attach the shield 10 to the digging tool 12, the blade 30 of the tool head 16 is inserted into the blade slot 28 of the shield 10, with the mounting hole 26 being aligned with the collar bore 36, thus forming a shield-head unit 40 (FIG. 11B). The shield-head 40 unit is then placed over the gripping end 18 of the handle 14 and urged towards the working end 20 (FIG. 11C) until at least the collar 34 engages the working end 20 of the handle 14, with the shield 10 being positioned below the tool head 16 (FIG. 11D). The mounting hole 26 is generally sized to be slightly larger than the maximum dimension of the collar bore 36 so as to not interfere with the fitting of the tool head 16 on the handle 14 and smaller than the maximum dimension of the working end 20 of the handle 14 for engagement therewith. Preferably, the space between the mounting portion 22 and the tool head 16 is minimized or eliminated. The shield 10 is thereby sandwiched between the working end 20 and the tool head 16 and secured in place on the handle. The shield 10 can be subsequently removed from the tool 12 if desired by simply urging the tool head 16 and shield-head 40 unit off the handle and removing the shield 10 from the tool head 16.

As the shield 10 is attached below the tool head 16, the shield 10 does not interfere with hand placement along the length of the handle 14. Further, the shield 10 is secured axially and laterally in place, while being easily attached and detached from the digging tool 12 in the same manner as the tool head 16 itself without the requirement of additional tools or parts. In addition, the simple design of the shield 10 results in easy clean-up of the shield 10 while either attached or detached from the digging tool 12.

While it is particularly contemplated that the shield 10 is for use with digging tools 12 having a removable tool head 16 slidably mounted onto the handle 14, it is also useful with tools 12 having other mounting means that permit the shield-head unit 40 to be secured to the handle 14, as would be apparent to one skilled in the art.

Figure 13:
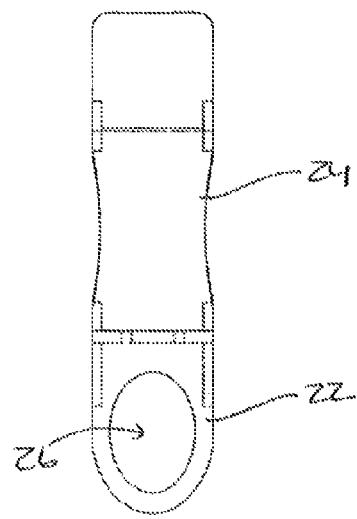
FIG. 13 is a bottom view of FIG. 12.
Figure 14:
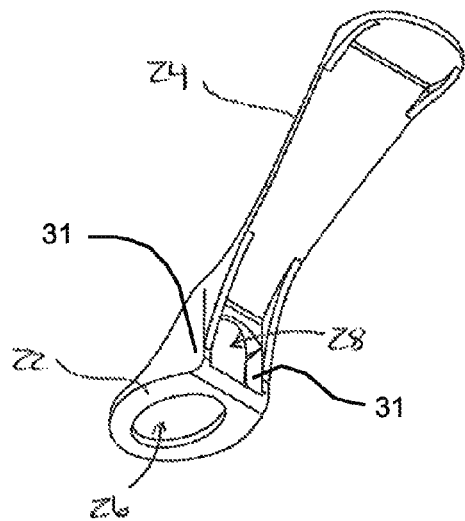
FIG. 14 is a perspective view of yet another embodiment of a shield in accordance with the present invention, with the shield adapted for use with a pickaxe and having a flared shield.
Figure 15:
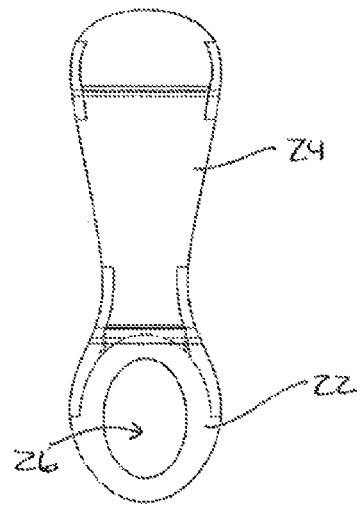
FIG. 15 is a bottom view of FIG. 14.
Figure 16:
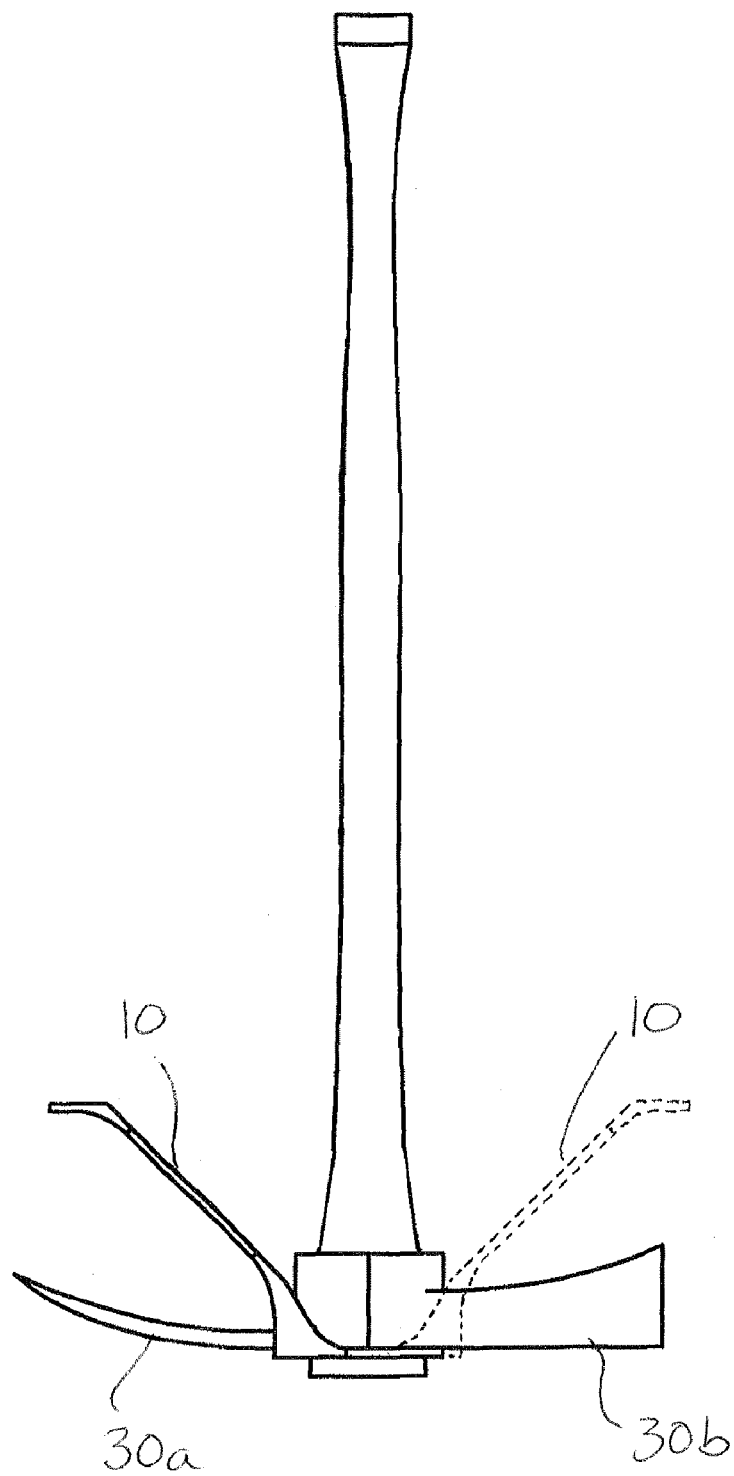
FIG. 16 is a side elevational view of yet another embodiment of a shield according to the present invention, with the shield attached to a pulaski and showing reversible positioning of the shield.
Figure 19B:
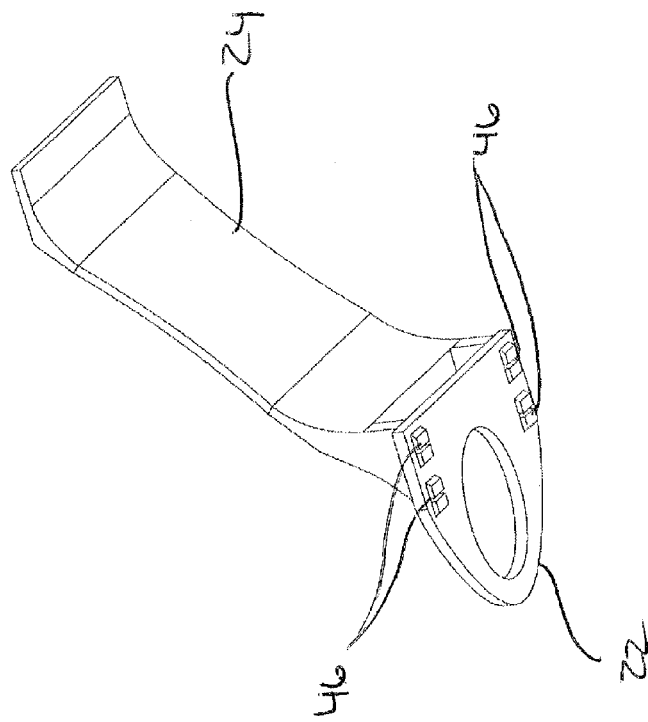
FIG. 19B is the shield of FIG. 19A with the shield assembled.
Figure 19A:
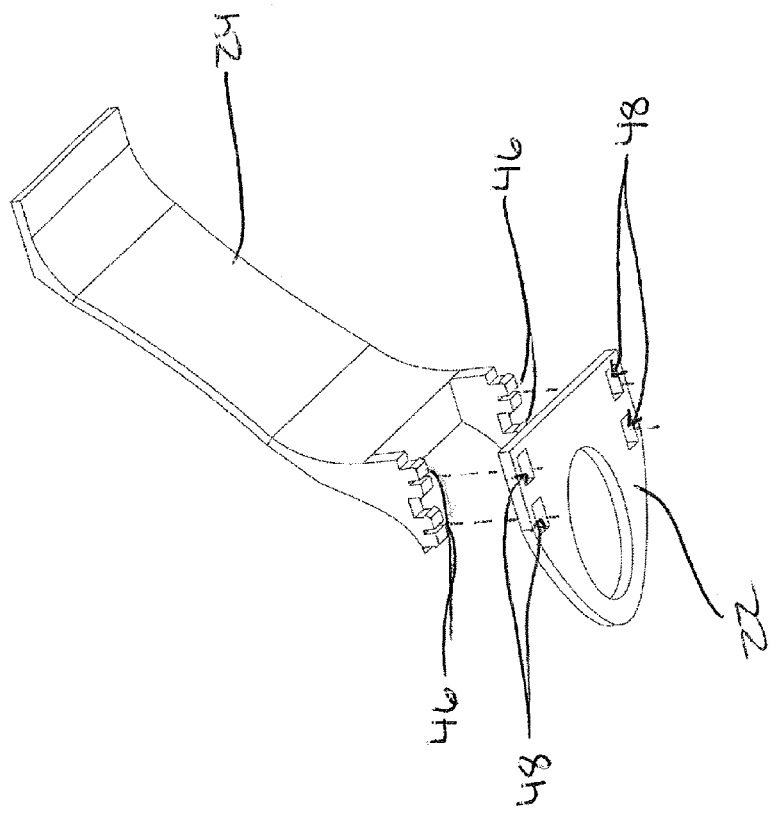
FIG. 19A is a perspective and exploded view of yet another embodiment of a shield according to the present invention with the shield having replaceable shield portion.
Figure 20B:
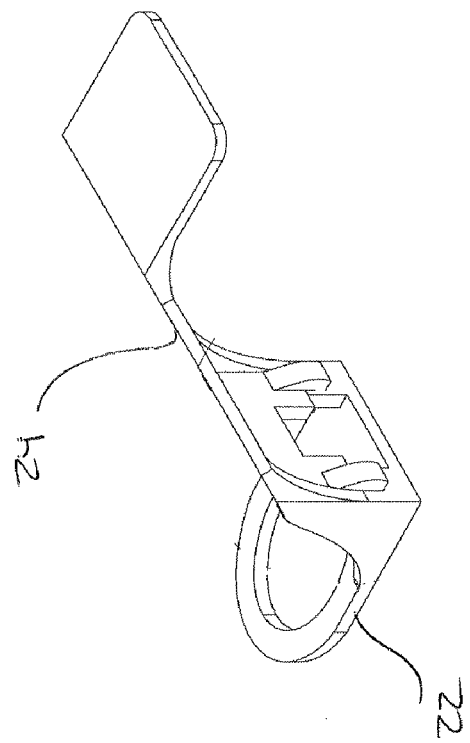
FIG. 20B is the shield of FIG. 20A with the shield assembled.
Figure 20A:
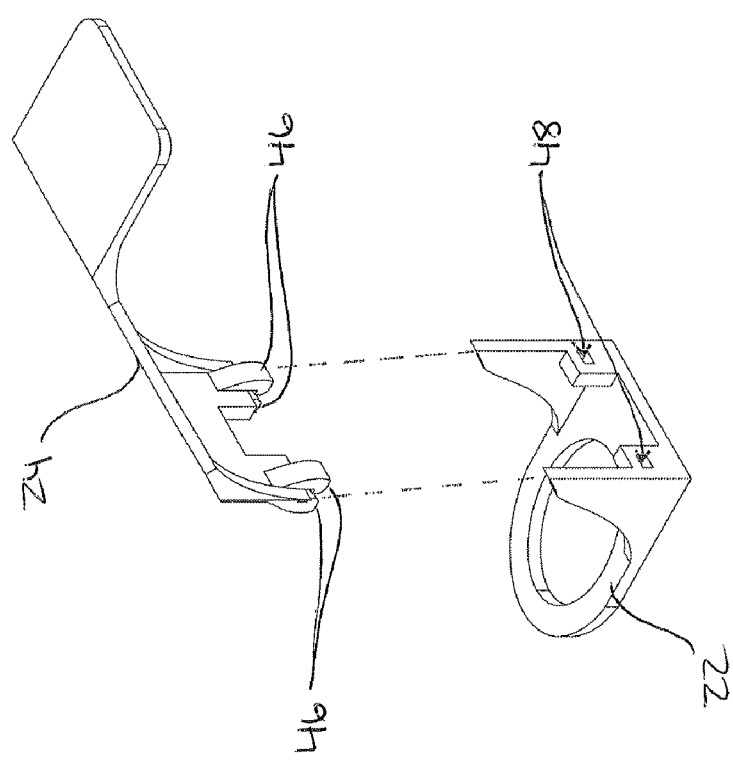
FIG. 20A is a perspective and exploded view of yet another embodiment of a shield according to the present invention with the shield having replaceable shield portion.

With further reference to FIGS. 12-15, the shield 10 can be adapted for use with a wide variety of digging tools 12. In particular, the size and shape of the blade slot 28 can be adjusted to accommodate a particular blade 30, such as that of a mattock, pickaxe, axe, adze, maul, or a combination thereof. In the examples shown, the slot 28 in FIG. 7 is particularly adapted for use with a mattock blade, while the slot 28 in FIGS. 12 and 14 is particularly adapted for use with a pickaxe blade. A shield 10 having a slot 28 adapted to accommodate more than one type of blade 30 is particularly convenient for use with tools 12 having a combination of two opposing blades 30. For example, as shown in FIG. 16, the shield 10 can reversibly positioned on a pulaski to cover either the mattock blade 30a or the axe blade 30b, for use as desired. In the same manner, the slot 28 can also be adapted for use with both a blade 30 and any opposing outwardly extending structure such a counterweight (not shown). In either case, or in the absence of any opposing outwardly extending structure, the reversible positioning of the shield 10 provides for convenient storage of the shield 10 on the tool 12 when the shield 10 is not in use.

Figure 10:
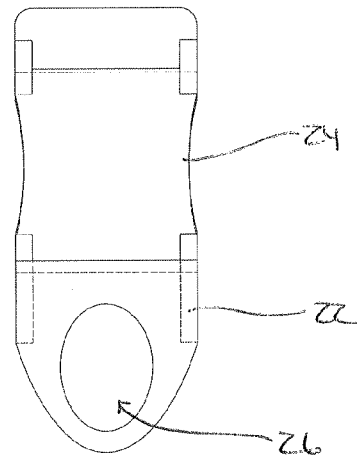
FIG. 10 is a bottom view of FIG. 7.

The shield portion 24 is generally configured to provide suitable protection to a worker using the 12 tool while not interfering with operation of the tool 12, which can be adapted as necessary. For example, FIGS. 10, 13, and 14 show variations of the dimensions and shape of the shield portion 24 as adapted for use with different tools. Generally, the shield portion 24 is at least as wide as the maximum width of the blade 30, and shield portion 24 does not extend beyond the end of the blade 30 so as to not interfere with the contacting of the blade 30 on a working surface. With particular reference to FIG. 8, the angle A of the shield portion 24 relative to the mounting portion 22 can also be suitably adjusted, such as, for example between an angle A of about 115 degrees to about 160 degrees.

Some variations of the shield portion include a generally outwardly extending lip 42 formed at a distal end 43 and generally downwardly extending side extensions 45 (FIG. 12) which help to contain the scatter of the debris and may also stiffen the shield. The generally outwardly extending lip 42 may also include a generally outwardly and downwardly extending lip 42 or a downwardly curved lip 42. Optionally, the shield 10 can include gussets 44 to stiffen the shield portion 24. For example, the gussets 44 can be placed between the mounting portion 22 and the shield portion 24 and/or between the lip 42 and the shield portion 24.

The shield 10 may be of any suitable fabrication as would be apparent to one skilled in the art. For example, the shield can be fabricated from metal, high density polyethylene, composites, fiberglass, or urethane.

With reference to FIGS. 17A-19B, the shield 10 can be replacably coupled to the mounting portion 22 at a connector. In the embodiments shown, the connector comprises projections 46 extending from the shield portion 24 which engage corresponding holes or notches 48 in the mounting portion 22 in a snap-fit. As particularly seen in FIG. 17A, posts 50 extending from the mounting portion 22 and which engage post holes 52 in the shield portion 24 can also be included for additional security. A replaceable shield portion 24 may be particularly convenient for situations in which frequent replacement of the shield portion 24 is necessary.

Although embodiments of the invention have been described in some detail herein above, those skilled in the art will recognize that various substitutions and modifications of the invention may be made without departing from the scope of the invention.

The embodiment(s) of the invention in which an exclusive property or privilege is claimed are defined as follows:

1. A removable shield for a hand-held digging tool having a handle and a removable tool head, the handle having a gripping end and an outwardly tapered working end, the tool head having a tapered bore and a generally outwardly extending tool blade, the tapered bore being slidable along the handle for engagement of the tool head with the outwardly tapered working end, the shield comprising:
   a shield portion;
   a mounting portion having two sidewalls extending from two sides of the mounting portion and connected to the shield portion; and
   a blade slot, the blade slot being formed by the two sidewalls, the shield portion and the mounting portion , wherein
   when the mounting portion is aligned with the tapered bore, for passing the handle therethrough,
      and is sandwiched between the tool head and the outwardly tapered working end of the handle,
      the tool blade extends outwardly from the tool head and passes through blade slot, and
   the shield portion extends outwardly between the tool blade and the gripping end, wherein in use, the shield portion intercepts debris from the tool blade.

2. The removable shield of claim 1 wherein mounting portion is a mounting hole.

3. The removable shield of claim 1 wherein the blade slot is adapted to permit passage of an axe blade, a pickaxe blade, a mattock blade, a maul blade, and adze blade, or any combination thereof.

4. The removable shield of claim 1 wherein the shield portion extends outwardly no longer than the length of the blade.

5. The removable shield of claim 1 wherein the shield portion is at least as wide as a maximum width of the blade.

6. The removable shield of claim 1 wherein the mounting portion and the shield portion form an angle of from about 115 degrees to about 160 degrees.

7. The removable shield of claim 1 wherein a distal end of the shield portion forms a generally outwardly extending lip.

8. The removable shield of claim 7 further comprising at least one gusset extending between the lip and the shield portion.

9. The removable shield of claim 1 wherein each side wall further comprises one gusset extending between the mounting portion and the shield portion.

10. The removable shield of claim 1 wherein the shield is fabricated from a material comprising any one or more of high density polyethylene, urethane, fiberglass, composites, or metal.

11. The removable shield of claim 1 wherein the shield is fabricated from high density polyethylene.

12. The removable shield of claim 1 wherein the shield portion is removably attached to the mounting portion.

13. The removable shield of claim 1 wherein the shield portion further comprises generally downwardly extending side extensions.

14. A removable shield for a hand-held digging tool having a handle and a removable tool head, the handle having a gripping end and an outwardly tapered working end, the tool head having a tapered bore and a generally outwardly extending tool blade, the tapered bore being slidable along the handle for engagement of the tool head with the outwardly tapered working end, the, the shield comprising:
   a shield portion, a mounting portion having a mounting hole, and a blade slot, the mounting portion further having two sidewalls extending from two sides of the mounting portion and connected to the shield portion, the blade slot being formed by the two sidewalls, the shield portion and the mounting portion;
   the blade slot being adapted to pass the tool blade therethrough for aligning the tapered bore with the mounting hole for passing the handle therethrough;
   the mounting hole being sized to permit the mounting portion to be sandwiched between the outwardly tapered working end and the tool head; and
   the shield portion extending laterally outwardly and upwardly from the mounting portion for intercepting debris from the tool blade when the tool blade is in use, the shield portion outwardly extending no longer than the length of the blade, the shield portion and the mounting portion forming an angle of from about 115 degrees to about 160 degrees.

15. The removable shield of claim 14 wherein the blade slot is adapted to permit passage of an axe blade, a pickaxe blade, a mattock blade, a maul blade, an adze blade, or any combination thereof.

16. A hand-held digging tool comprising the removable shield of claim 1.

17. A hand-held digging tool and removable shield comprising:
   a hand-held digging tool having a handle and a removable tool head, the handle having a gripping end and an outwardly tapered working end, the tool head having a tapered bore and a generally outwardly extending tool blade, the tapered bore being slidable along the handle for engagement of the tool head with the outwardly tapered working end, and:

a removable shield having a shield portion, a mounting portion, and a blade slot formed therebetween;

the blade slot being adapted to pass the tool blade therethrough for aligning the tapered bore with the mounting portion for passing the handle therethrough;

the mounting portion being sandwiched between the tool head and the outwardly tapered working end; and the shield portion extending outwardly between the tool blade and the gripping end, wherein in use, the shield portion intercepts debris from the tool blade.

18. The removable shield of claim 17 wherein mounting portion is a mounting hole.

19. The removable shield of claim 17 wherein the blade slot is adapted to permit passage of an axe blade, a pickaxe blade, a mattock blade, a maul blade, and adze blade, or any combination thereof.

20. The removable shield of claim 17 wherein the shield portion extends outwardly no longer than the length of the blade.

21. The removable shield of claim 17 wherein the shield portion is at least as wide as a maximum width of the blade.

22. The removable shield of claim 17 further comprising at least one gusset extending between the mounting portion and the shield portion.

23. The removable shield of claim 22 further comprising at least one gusset extending between the lip and the shield portion.

* * * * *